United States Patent
Sun et al.

(10) Patent No.: US 11,963,106 B2
(45) Date of Patent: Apr. 16, 2024

(54) UPLINK TRANSMIT POWER DETERMINING METHOD, NETWORK DEVICE, AND STORAGE MEDIUM

(71) Applicant: HUAWEI TECHNOLOGIES CO., LTD., Shenzhen (CN)

(72) Inventors: Wenjie Sun, Dongguan (CN); Longji Zeng, Dongguan (CN); Tianyun Yang, Dongguan (CN); Zhouyu Deng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 458 days.

(21) Appl. No.: 17/169,857

(22) Filed: Feb. 8, 2021

(65) Prior Publication Data

US 2021/0168727 A1 Jun. 3, 2021

Related U.S. Application Data

(63) Continuation of application No. PCT/CN2018/099676, filed on Aug. 9, 2018.

(51) Int. Cl.
*H04W 40/08* (2009.01)
*H04W 52/14* (2009.01)
(Continued)

(52) U.S. Cl.
CPC ....... *H04W 52/146* (2013.01); *H04W 52/242* (2013.01); *H04W 52/243* (2013.01);
(Continued)

(58) Field of Classification Search
CPC . H04W 52/146; H04W 76/27; H04W 52/242; H04W 52/243; H04W 52/365; H04W 52/367
See application file for complete search history.

(56) References Cited

U.S. PATENT DOCUMENTS

2012/0238305 A1* 9/2012 Xiao .................... H04W 52/40
  455/509
2013/0005379 A1* 1/2013 Yamazaki .......... H04W 72/541
  455/509
(Continued)

FOREIGN PATENT DOCUMENTS

CN 102076072 A 5/2011
CN 106165504 A 11/2016
(Continued)

OTHER PUBLICATIONS

Vivo, "Remaining issues on NR UL power control", 3GPP TSG RAN WG1 Meeting #92 R1-1801546,Athens, Greece, Feb. 26-Mar. 2, 2018, Total 5 Pages.
(Continued)

*Primary Examiner* — Dai Phuong
(74) *Attorney, Agent, or Firm* — Rimon PC (57) ABSTRACT

This application provides an uplink transmit power determining method, a related network device and storage medium. In the method, a terminal determines an uplink transmit power based on the repetition count of the UCI (uplink control information) it receives from a network device. The repetition count of the UCI on a user side is adaptively configured based on a PL(path loss), an interference the and the low coverage level for a user currently accessing at a high coverage level so that a transmit power of the UCI is controlled and an avalanche effect caused by always selecting full-power uplink transmission is avoided.

17 Claims, 4 Drawing Sheets

(51) Int. Cl.
 *H04W 52/24* (2009.01)
 *H04W 52/36* (2009.01)
 *H04W 76/27* (2018.01)
(52) U.S. Cl.
 CPC ....... *H04W 52/365* (2013.01); *H04W 52/367* (2013.01); *H04W 76/27* (2018.02)

(56) References Cited

U.S. PATENT DOCUMENTS

| | | | |
|---|---|---|---|
| 2013/0121186 | A1 | 5/2013 | Vajapeyam et al. |
| 2015/0236780 | A1* | 8/2015 | Jalali .................. B64U 80/30 455/12.1 |
| 2017/0245266 | A1 | 8/2017 | Yang et al. |
| 2018/0368081 | A1* | 12/2018 | Akkarakaran ...... H04W 52/365 |
| 2020/0163025 | A1* | 5/2020 | Osawa ............. H04W 52/0209 |
| 2021/0274357 | A1* | 9/2021 | Furuichi ............. H04W 52/146 |

FOREIGN PATENT DOCUMENTS

| | | |
|---|---|---|
| CN | 106233794 A | 12/2016 |
| CN | 106257856 A | 12/2016 |
| CN | 106961721 A | 7/2017 |
| CN | 107371229 A | 11/2017 |
| CN | 107580797 A | 1/2018 |
| EP | 2919534 A1 | 9/2015 |
| EP | 3295751 A1 | 3/2018 |
| WO | 2011041666 A2 | 4/2011 |
| WO | 2014183292 A1 | 11/2014 |
| WO | 2016182320 A1 | 11/2016 |
| WO | 2017135887 A1 | 8/2017 |
| WO | 2017153118 A1 | 9/2017 |
| WO | 2017157270 A1 | 9/2017 |

OTHER PUBLICATIONS

International Search Report for International Application No. PCT/CN2018/099676 dated Aug. 9, 2018.

3GPP TSG RAN WG1 Meeting #90bis, R1-1717508, Remaining issues on NR UL power control,vivo, Prague, CZ, 9th 13th, Oct. 2017,total 5 pages.

Panasonic: (E)PDCCH coverage enhancementfor MTC . 3GPP Draft; R1-135394 Nov. 1, 2013 total 8 pages.

* cited by examiner

UPLINK TRANSMIT POWER DETERMINING METHOD, NETWORK DEVICE, AND STORAGE MEDIUM

CROSS-REFERENCE TO RELATED APPLICATIONS

This application is a continuation of International Application No. PCT/CN2018/099676, filed on Aug. 9, 2018, the disclosure of which is hereby incorporated by reference in its entirety.

TECHNICAL FIELD

This application relates to communications technologies, and in particular, to an uplink transmit power determining method, a network device, and a storage medium.

BACKGROUND

In a narrowband internet of things (NB-IoT) system, most packet losses and latency problems are eventually found to be caused by interference. Interference may occur before and after NB-IoT network construction. Sources of the interference can be generally classified into interference from outside the NB-IoT system and interference from within the NB-IoT system. Introduction of interference is also related to networking. The interference from within the system is mainly caused by an excessively high transmit power of UE in a neighboring cell or a heavy load in a neighboring cell.

In the NB-IoT system, open-loop power control is used for an uplink power, and the uplink power is related to a coverage level and a repetition count of a channel. According to the protocol, when a repetition count of a physical uplink shared channel (PUSCH) is greater than 2, a terminal automatically uses PCMAX as a transmit power (that is, performs full-power transmission); or when a repetition count is less than 2, a transmit power is calculated based on the open-loop power control. Uplink control information (UCI) is transmitted on the PUSCH, and a transmit power of the UCI satisfies PUSCH power control. Currently, a repetition count of the UCI is configured by a base station based on a coverage level and the repetition count of the UCI cannot be adaptively adjusted. A higher coverage level indicates a greater configured repetition count of the UCI. The terminal selects the coverage level based on a downlink reference signal received power (RSRP) or a signal to interference plus noise ratio (SINR), and then reports the coverage level to the base station. The base station performs uplink and downlink scheduling based on the reported coverage level. The repetition count of the UCI is directly determined based on a downlink coverage level.

If the terminal selects to perform access based on a coverage level 1 or 2 due to a poor downlink SINR, the configured repetition count of the UCI is likely to be greater than 2 and the repetition count of the UCI is configured only once. Consequently, the UCI of the terminal is always transmitted at a full power, and a noise floor continuously increases for a service with a frequent heartbeat packet. In a severe scenario, an uplink avalanche effect is likely to occur, and consequently, a live-network user cannot access the network.

SUMMARY

Embodiments of this application provide an uplink transmit power determining method, a network device, and a storage medium, which are used as a solution to a current scheme for determining a repetition count of UCI, in which the UCI of a terminal is always transmitted at a full power, and a noise floor continuously increases for a service with a frequent heartbeat packet. In a severe scenario, an uplink avalanche effect is likely to occur, and consequently, a live-network user cannot access the network.

A first aspect of the embodiments of this application provides an uplink transmit power determining method. The method includes:

receiving a power headroom report WEIR) reported by a terminal;

obtaining a current path loss (PL) of the terminal based on the PHR;

determining, based on the PL and an obtained interference margin, a repetition count of UCI of the terminal; and sending the repetition count of the UCI to the terminal, where the repetition count of the UCI is used to determine an uplink transmit power.

In a specific implementation of the solution, the determining, based on the PL and an obtained interference margin, a repetition count of UCI of the terminal includes:

comparing a sum of the PL and the interference margin with a preset threshold; and if the sum of the PL and the interference margin is greater than the threshold, determining the repetition count of the UCI based on a high coverage level; or if the sum of the PL and the interference margin is less than the threshold, determining the repetition count of the UCI based on a low coverage level.

In another specific implementation of the solution, the method further includes:

obtaining the interference margin through calculation based on a detected interference noise value.

Based on any one of the foregoing solutions, in a specific manner of obtaining a value of the PL, the obtaining a current path loss PL of the terminal based on the PHR includes:

obtaining the current PL of the terminal through inverse calculation according to a calculation formula $PH_c(i) = P_{CMAX,c}(i) - \{P_{O\_NPUSCH,c}(1) + \alpha_c(1) \cdot PL_c\}$ of the PHR, where i represents a slot, $PH_c(i)$ is a lower limit of a measured quantity value corresponding to the PHR, $P_{O\_NPUSCH,c}(1)$ is an expected power that is for non-persistent scheduling and that is configured by a network device, $\alpha_c(1)$ is a path loss factor configured by the network device, $P_{CMAX,c}(i)$ is a maximum transmit power allowed by the terminal device, and $PL_c$ is the current PL of the terminal.

In a specific implementation, the receiving a power headroom report (PHR) reported by a terminal includes:

receiving, in a random access process, the PHR sent by the terminal in a radio resource control RRC connection request message.

In a specific implementation, the sending the repetition count of the UCI to the terminal includes:

carrying the repetition count of the UCI in an RRC connection establishment message sent to the terminal.

Based on any one of the foregoing implementations, the method further includes:

when the PL of the terminal and/or the interference margin change/changes, re-determining, based on a changed PL and interference margin, the repetition count of the UCI of the terminal, and sending a re-determined repetition count of the UCI to the terminal.

A second aspect of this application provides a network device, including:

a receiving module, configured to receive a power headroom report PHR reported by a terminal;

a processing module, configured to obtain a current path loss PL of the terminal based on the PHR, where the processing module is further configured to determine, based on the PL and an obtained interference margin, a repetition count of UCI of the terminal; and a sending module, configured to send the repetition count of the UCI to the terminal, where the repetition count of the UCI is used to determine an uplink transmit power.

Optionally, the processing module is specifically configured to:

compare a sum of the PL and the interference margin with a preset threshold; and if the sum of the PL and the interference margin is greater than the threshold, determine the repetition count of the UCI based on a high coverage level; or if the sum of the PL and the interference margin is less than the threshold, determine the repetition count of the UCI based on a low coverage level.

Optionally, the processing module is further configured to:

obtain the interference margin through calculation based on a detected interference noise value.

Optionally, the processing module is specifically configured to:

obtain the current PL of the terminal through inverse calculation according to a calculation formula $PH_c(i)= P_{CMAX,c}(i)-\{P_{O\_NPUSCH,c}(1)+\alpha_c(1)\cdot PL_c\}$ of the PHR, where i represents a slot, $PH_c(i)$ is a lower limit of a measured quantity value corresponding to the PHR, $P_{O\_NPUSCH,c}(1)$ is an expected power that is for non-persistent scheduling and that is configured by the network device, $\alpha_c(1)$ is a path loss factor configured by the network device, $P_{CMAX,c}(i)$ is a maximum transmit power allowed by the terminal device, and $PL_c$ is the current PL of the terminal.

Optionally, the receiving module is specifically configured to:

receive, in a random access process, the PHR sent by the terminal in a radio resource control RRC connection request message.

Optionally, the sending module is specifically configured to:

carry the repetition count of the UCI in an RRC connection establishment message sent to the terminal.

Optionally, the processing module is further configured to:

when the PL of the terminal and/or the interference margin change/changes, re-determine, based on a changed PL and interference margin, the repetition count of the UCI of the terminal; and the sending module is further configured to send a re-determined repetition count of the UCI to the terminal.

A third aspect of this application provides a network device, including:

a receiver, configured to receive a power headroom report PHR reported by a terminal;

a processor, configured to obtain a current path loss PL of the terminal based on the PHR, where the processor is further configured to determine, based on the PL and an obtained interference margin, a repetition count of UCI of the terminal; and a transmitter, configured to send the repetition count of the UCI to the terminal, where the repetition count of the UCI is used to determine an uplink transmit power.

Optionally, the processor is specifically configured to:

compare a sum of the PL and the interference margin with a preset threshold; and if the sum of the PL and the interference margin is greater than the threshold, determine the repetition count of the UCI based on a high coverage level; or if the sum of the PL and the interference margin is less than the threshold, determine the repetition count of the UCI based on a low coverage level.

Optionally, the processor is further configured to:

obtain the interference margin through calculation based on a detected interference noise value.

Optionally, the processor is specifically configured to:

obtain the current PL of the terminal through inverse calculation according to a calculation formula $PH_c(i)= P_{CMAX,c}(i)-\{P_{O\_NPUSCH,c}(1)+\alpha_c(1)\cdot PL_c\}$ of the PHR, where i represents a slot, $PH_c(i)$ is a lower limit of a measured quantity value corresponding to the PHR, $P_{O\_NPUSCH,c}(1)$ is an expected power that is for non-persistent scheduling and that is configured by the network device, $\alpha_c(1)$ is a path loss factor configured by the network device, $P_{CMAX,c}(i)$ is a maximum transmit power allowed by the terminal device, and $PL_c$ is the current PL of the terminal.

Optionally, the receiver is specifically configured to:

receive, in a random access process, the PHR sent by the terminal in a radio resource control RRC connection request message.

Optionally, the transmitter is specifically configured to:

carry the repetition count of the UCI in an RRC connection establishment message sent to the terminal.

Optionally, the processor is further configured to:

when the PL of the terminal and/or the interference margin change/changes, re-determine, based on a changed PL and interference margin, the repetition count of the UCI of the terminal; and the transmitter is further configured to send a re-determined repetition count of the UCI to the terminal.

A fourth aspect of this application provides a computer-readable storage medium, where the computer-readable storage medium stores a computer program, and the computer program is used to implement the uplink transmit power determining method according to any one of the implementations of the first aspect.

A fifth aspect of this application provides a computer program product, where the computer program product includes a computer program, and when the computer program is run by a network device, the network device is enabled to perform the uplink transmit power determining method according to any one of the implementations of the first aspect.

According to the uplink transmit power determining method, the network device, and the storage medium provided in the embodiments of this application, the network device obtains the path loss PL based on the power headroom report reported by the terminal, determines, based on the path loss and the interference margin, the repetition count of the UCI of the terminal, and sends the repetition count of the UCI to the terminal. The terminal determines the uplink transmit power based on the repetition count of the UCI. To be specific, the repetition count of the UCI on a user side is adaptively configured based on the PL and the interference, to determine whether the repetition count of the UCI needs to be configured based on the low coverage level for a user currently accessing at the high coverage level, so that the transmit power of the UCI is controlled, and the avalanche effect caused by always selecting full-power uplink transmission is avoided.

DESCRIPTION OF EMBODIMENTS

In a narrowband internet of things (NB-IoT) system, open-loop power control is used for an uplink power, and the uplink power is related to a coverage level and a repetition count of a channel. According to the protocol, when a repetition count of an uplink physical uplink shared channel (PUSCH) is greater than 2, a terminal automatically uses PCMAX as a transmit power (that is, performs full-power transmission); or when a repetition count is less than 2, a transmit power is calculated based on the open-loop power control, and a formula is as follows:

$$P_{NPUSCH,c}(i) = \min\begin{cases} P_{CMAX,c}(i) \\ 10\log_{10}(M_{NPUSCH,c}(i)) + P_{0\_NPUSCH,c}(i) + \alpha_c(j) \cdot PL_c \end{cases}$$

$P_{CMAX}$ is a maximum transmit power of the terminal.

$M_{NPUSCH}$ is a quantity of subcarriers, where when single-tone transmission uses a subcarrier spacing of 3.75 kHz, $M_{NPUSCH}$ is set to ¼, when single-tone transmission uses a subcarrier spacing of 15 kHz, $M_{NPUSCH}$ is set to 1, or when multi-tone transmission is used, $M_{NPUSCH}$ is set to 3, 6, or 12.

PL is a downlink path loss value estimated by UE, and is referred to as a path loss or a path loss value for short.

$P_{O\_NPUSCH}$ is a received power expected by a base station, and is determined by the base station.

α is a path loss compensation factor.

Uplink control information (UCI) is transmitted on the uplink PUSCH, and a transmit power of the UCI satisfies uplink PUSCH power control. A repetition count of the UCI is configured by the base station based on a coverage level and the repetition count of the UCI cannot be adaptively adjusted. A higher coverage level indicates a greater configured repetition count of the UCI. The terminal selects the coverage level based on a downlink reference signal received power (RSRP) or a signal to interference plus noise ratio (SINR), and then reports the coverage level to the base station. The base station performs uplink and downlink scheduling based on the reported coverage level. To be specific, an uplink coverage level is directly determined based on downlink signal quality, and the repetition count of the UCI is directly determined based on a downlink coverage level.

However, if the terminal selects to perform access based on a coverage level 1 or 2 due to a limited downlink SINR, the configured repetition count of the UCI is likely to be greater than 2, the repetition count of the UCI is delivered by using a message 4 (Msg4 for short, which refers to a radio resource control (RRC) connection establishment message in a random access process), and is configured only once. Consequently, the UCI of the terminal is always transmitted at a full power, and a noise floor continuously increases for a service with a frequent heartbeat packet. In a severe scenario, a noise floor of a neighboring cell increases by more than 30 dB, an uplink avalanche effect occurs, and consequently, a live-network user cannot access the network.

To resolve the foregoing problem, that is, to control the transmit power of the terminal, this application provides an uplink transmit power determining method, to provide a solution to adaptive adjustment of the repetition count of the UCI, and a final objective is to reduce uplink interference caused by an excessively high transmit power of the terminal.

The uplink transmit power determining method provided in this application is specifically used in a narrowband internet of things (NB-IoT) system or another internet of things system. Main network elements in the NB-IoT communications system in this application include a core network (for example, a packet core network EPC)), a network device (for example, an eNB base station), and a terminal. The terminal accesses the network via a base station, a routing node, or another network device. The network device accesses the core network, to complete data backhaul and forward transmission.

The technical solutions of embodiments of this application may further be used in a 5G communications system or a future communications system, and may also be used in various other wireless communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, and a universal mobile telecommunications system (UMTS).

It should be understood that, the network device in the solutions may be a base transceiver station (Base Transceiver Station, BTS for short) in the global system for mobile communications (Global System of Mobile communication, GSM for short) or the code division multiple access (Code Division Multiple Access, CDMA for short) system, a NodeB (NodeB, NB for short) in the wideband code division multiple access (Wideband Code Division Multiple Access, WCDMA for short) system, an evolved NodeB (Evolutional NodeB, eNB or eNodeB for short) in the LTE system, a relay station or an access point, a base station in a 5G network, or the like. This is not limited herein.

The mentioned terminal may be a wireless terminal or a wired terminal. The wireless terminal may refer to a device that provides a user with voice and/or other service data connectivity, a handheld device with a wireless connection function, or another processing device connected to a wireless modem. The wireless terminal may communicate with one or more core networks through a radio access network (RAN for short). The wireless terminal may be a mobile terminal, such as a mobile phone (also referred to as a "cellular" phone) or a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (PCS for short) phone, a cordless telephone, a session initiation protocol (Session Initiation Protocol, SIP for short) phone, a wireless local loop (WLL for short) station, or a personal digital assistant (PDA for short). The wireless terminal may also be referred to as a system, a subscriber unit, a subscriber station, a mobile station, a mobile console, a remote station, a remote terminal, an access terminal, a user terminal, a user agent, or a user device. This is not limited herein.

The following describes in detail, by using several specific embodiments, the uplink transmit power determining method provided in this application.

Figure 1:
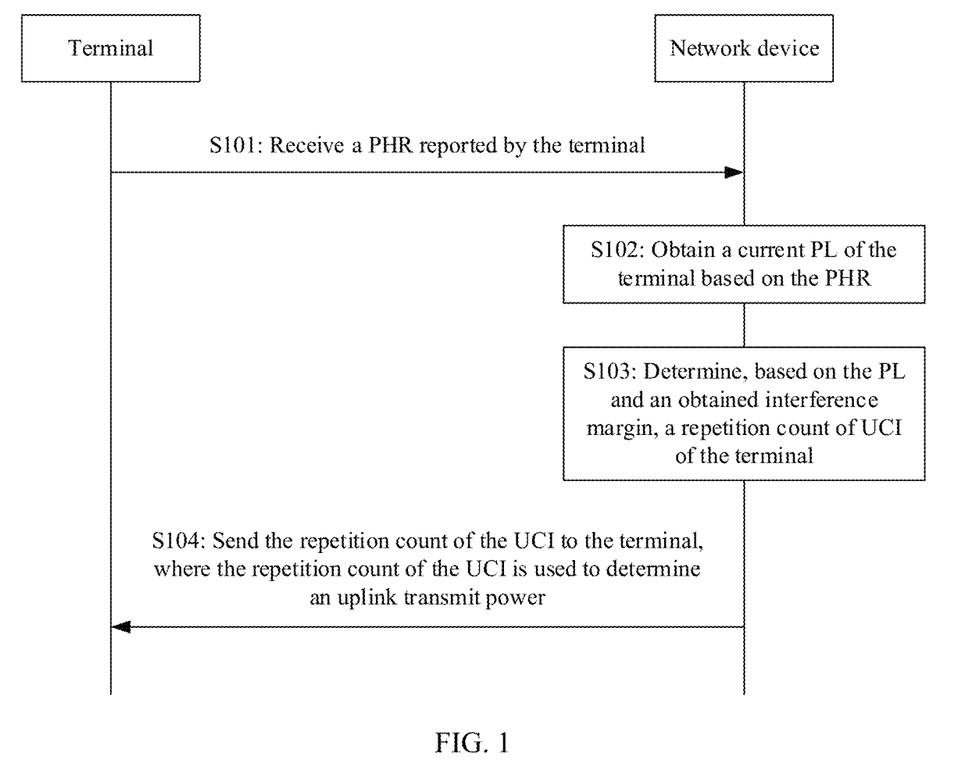
FIG. 1 is a schematic flowchart of Embodiment 1 of an uplink transmit power determining method according to this application.

FIG. 1 is a schematic flowchart of Embodiment 1 of an uplink transmit power determining method according to this application. As shown in FIG. 1, specific implementation steps of the uplink transmit power determining method include the following steps.

S101: Receive a power headroom report (PHR) reported by a terminal.

In this step, a power loss is caused when a wireless signal is transmitted from a transmitting end to a receiving end, and a power headroom indicates a remaining power after the terminal completes current transmission. The PHR is sent through a control element (CE) at a media access control (MAC) layer. A network side (that is, a network device) estimates, based on a value of the power headroom, a bandwidth that can be used by the terminal in a specific uplink subframe. More bandwidth used by the terminal indicates a greater transmit power. However, the transmit power cannot exceed a maximum power allowed in the protocol.

The terminal transmits the power headroom to the network device in at least the following two manners:

1. When a variation of a path loss value exceeds a specific threshold, the network indicates the terminal to calculate the path loss value based on a reference signal, and on the terminal side, if the variation of the path loss value exceeds the specific threshold, the PHR is transmitted to the network device.

2. Timing transmission. A fixed time interval is configured, and the terminal periodically transmits the PHR to the network device at the time interval.

S102: Obtain a current path loss PL of the terminal based on the PHR.

In this step, after receiving the PHR sent by the terminal, the network device may deduce the current PL of the terminal according to a calculation formula of the PHR, to subsequently determine a repetition count of UCI based on the PL value.

S103: Determine, based on the PL and an obtained interference margin, the repetition count of the UCI of the terminal.

In this step, if only the path loss is considered when the repetition count of the UCI is configured, a relatively small repetition count may be selected for the UCI. When there is interference, the UCI may fail to be demodulated. Therefore, interference needs to be further considered. Therefore, when the network device determines the repetition count of the UCI of the terminal, the interference margin needs to be further considered.

In a specific implementation, the network device may determine the repetition count of the UCI of the terminal in the following manner:

The network device compares a sum of the PL and the interference margin with a preset threshold. The threshold herein may be determined based on a minimum coupling loss, and the minimum coupling loss may be a theoretical value obtained through a lab test.

If the sum of the PL and the interference margin is greater than the threshold, the network device determines the repetition count of the UCI based on a high coverage level; or if the sum of the PL and the interference margin is less than the threshold, the network device determines the repetition count of the UCI based on a low coverage level.

The high coverage level and the low coverage level herein indicate: If repetition counts of the UCI based on coverage levels 1 and 2 are greater than 2, the high coverage level refers to the coverage levels 1 and 2, and the corresponding low coverage level refers to a level 0; or if a repetition count of the UCI based on a coverage level 2 is greater than 2, the high coverage level refers to the coverage level 2, and the corresponding low coverage level refers to a level 0 and a level 1.

S104: Send the repetition count of the UCI to the terminal, where the repetition count of the UCI is used to determine an uplink transmit power.

In this step, after determining the repetition count of the UCI, the network device sends the repetition count of the UCI to the terminal, so that the terminal determines the uplink transmit power based on the repetition count of the UCI.

In this solution, the repetition count of the UCI can be adaptively adjusted. The repetition count of the UCI adaptively changes based on changes of the path loss and the interference margin. After receiving the repetition count of the UCI, the terminal calculates the uplink transmit power in a same manner as that in calculating a transmit power of a PUSCH. The UCI is a special PUSCH, and the transmit power is calculated in a same manner as that in calculating a transmit power of a common uplink PUSCH. To be specific, when the repetition count of the UCI is greater than 2, the terminal fixedly uses $P_{CMAX}$ as the transmit power (that is, performs full-power transmission); or when the repetition count of the UCI is less than 2, the transmit power is calculated based on open-loop power control. The formula is as follows:

$$P_{NPUSCH,c}(i) = \min \begin{cases} P_{CMAX,c}(i) \\ 10\log_{10}(M_{NPUSCH,c}(i)) + P_{0\_NPUSCH,c}(i) + \alpha_c(j) \cdot PL_c \end{cases}$$

$P_{CMAX}$ is a maximum transmit power of the terminal. $M_{NPUSCH}$ is a quantity of subcarriers, where when single-tone transmission uses a subcarrier spacing of 3.75 kHz, $M_{NPUSCH}$ is set to ¼, when single-tone transmission uses a subcarrier spacing of 15 kHz, $M_{NPUSCH}$ is set to 1, or when multi-tone transmission is used, $M_{NPUSCH}$ is set to 3, 6, or 12. PL is a path loss or a path loss value estimated by the terminal. $P_{O\_NPUSCH}$ is a received power expected by the network device, and is determined by the network device. $\alpha$ is a path loss compensation factor.

According to the uplink transmit power determining method provided in this embodiment, the network device obtains the path loss PL based on the power headroom report reported by the terminal, determines, based on the path loss and the interference margin, the repetition count of the UCI of the terminal, and sends the repetition count of the UCI to the terminal. The terminal determines the uplink transmit power based on the repetition count of the UCI. To be specific, the repetition count of the UCI on a user side is adaptively configured based on the PL and the interference, to determine whether the repetition count of the UCI needs to be configured based on the low coverage level for a user currently accessing at the high coverage level, so that the transmit power of the UCI is controlled, and an avalanche effect caused by always selecting full-power uplink transmission is avoided.

Figure 2:
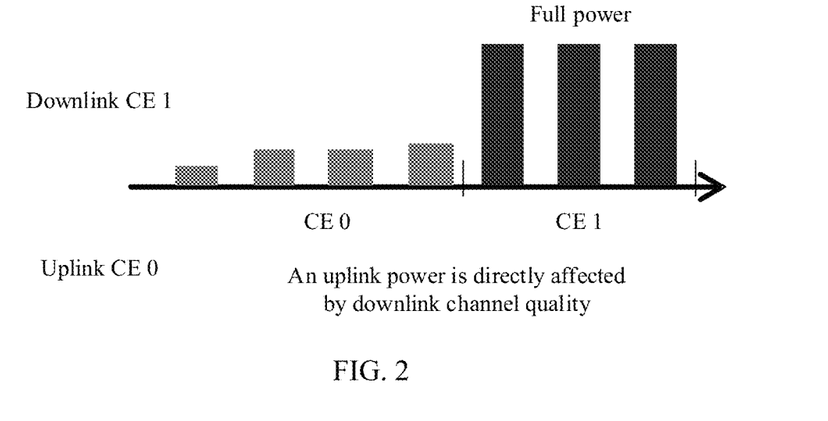
FIG. 2 is a schematic diagram of a current coverage level and an uplink transmit power.
Figure 3:
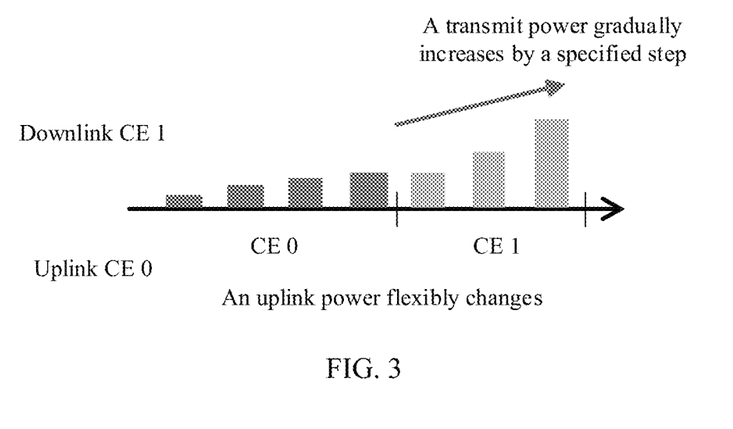
FIG. 3 is a schematic diagram of a coverage level and an uplink transmit power according to this application.

Based on the foregoing embodiment, FIG. 2 is a schematic diagram of a current coverage level and an uplink transmit power. FIG. 3 is a schematic diagram of a coverage level and an uplink transmit power according to this application. As shown in FIG. 2, in a currently common manner, a CE 0 indicates uplink, a CE 1 indicates downlink, and heights of bars indicate power values. A repetition count of UCI is configured by a base station based on a coverage level and the repetition count of the UCI cannot be adaptively adjusted. A higher coverage level indicates a greater configured repetition count of the UCI. If the terminal selects to perform access based on a coverage level 1 or 2 due to a limited downlink SINR, the configured repetition count of the UCI is likely to be greater than 2 and the repetition count of the UCI is configured only once. Consequently, the UCI of the terminal is always transmitted at a full power, and a noise floor continuously increases for a service with a frequent heartbeat packet. In a severe scenario, an uplink avalanche effect is likely to occur, and consequently, a live-network user cannot access the network. Similarly, in FIG. 3, a CE 0 indicates uplink, a CE 1 indicates downlink, and heights of bars indicate power values. It can be learned that in the technical solutions provided in this application, uplink and downlink decoupling are performed, so that an uplink transmit power flexibly changes based on uplink channel quality, and is not directly determined based on downlink channel quality. In this way, a quantity of times of uplink full-power transmission are reduced, thereby reducing uplink interference.

Figure 4:
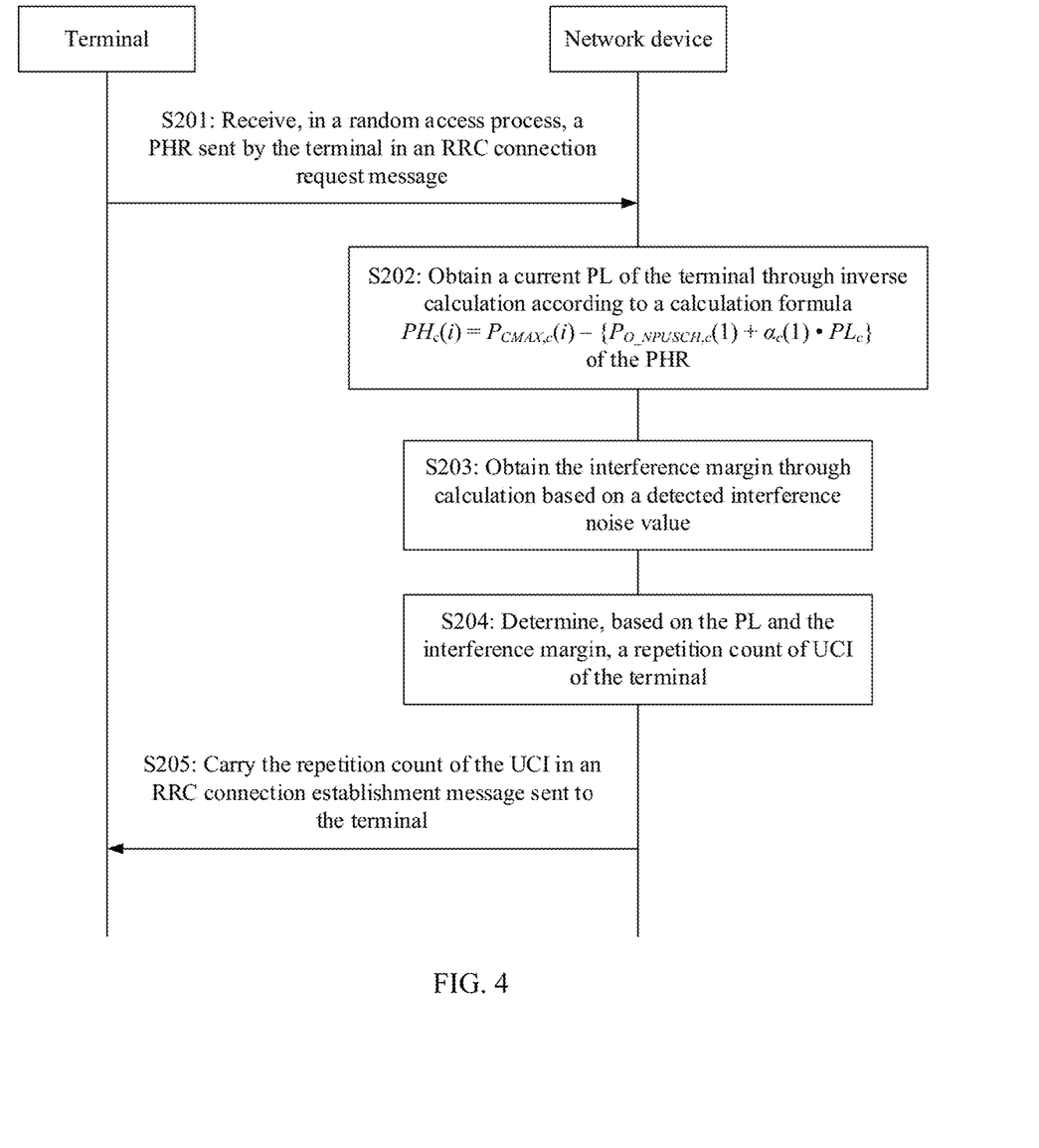
FIG. 4 is a schematic flowchart of Embodiment 2 of an uplink transmit power determining method according to this application.

FIG. 4 is a schematic flowchart of Embodiment 2 of an uplink transmit power determining method according to this application. As shown in FIG. 4, based on the foregoing embodiment, a specific implementation of the uplink transmit power determining method provided in this application includes the following steps.

S201: Receive, in a random access process, a PHR sent by a terminal in a radio resource control (RRC) connection request message.

In this step, in a random access process, the terminal carries the PHR in a Msg 3 and sends the Msg 3 to a network device, for example, sends the Msg 3 to a base station. The Msg 3 is an RRC connection request message. To be specific, when specifically transmitting the PHR to the network device, the terminal may perform transmission in the random access process.

S202: Obtain an interference margin through calculation based on a detected interference noise value.

In this step, if only an uplink path loss is considered when a repetition count of UCI is configured, a relatively small repetition count is selected for the UCI. When there is interference, the UCI may fail to be demodulated. Therefore, interference needs to be further considered.

Therefore, the network device may obtain the interference margin through calculation based on the detected interference noise value NI. The NI value may be periodically reported by the terminal to the network device.

S203: Obtain a current PL of the terminal through inverse calculation according to a calculation formula $PH_c(i) = P_{CMAX,c}(i) - \{P_{O\_NPUSCH,c}(1) + \alpha_c(1) \cdot PL_c\}$ of the PHR.

In this step, i represents a slot, and may be defined in a protocol. A value of 1 is {1, 2}, where 1=1 indicates data transmission on a PUSCH, and 1=2 indicates that the Msg 3 on the PUSCH. $PH_c(i)$ is a lower limit of a measured quantity value (Measured quantity value) corresponding to the PHR, and measured quantity values corresponding to PHR values based on each coverage level are shown in Table 1 and Table 2. $P_{O\_NPUSCH,c}(1)$ is an expected power that is for non-persistent scheduling and that is configured by the network device. $\alpha_c(1)$ is a path loss factor configured by the network device. $P_{CMAX,c}(i)$ is a maximum transmit power allowed by the terminal device. $PL_c$ is the current PL of the terminal. For example, when the network device is the base station, $P_{O\_NPUSCH,c}(1)$ and $\alpha_c(1)$ are uplink power control parameters PONominalPUSCH and PassLossCoeff that are configured by the base station.

TABLE 1

PHR mapping table at coverage level 0

| PHR value (Value) | Measured quantity value |
|---|---|
| POWER_HEADROOM_0 | [−54] <= PH < 5 |
| POWER_HEADROOM_1 | 5 <= PH < 8 |
| POWER_HEADROOM_2 | 8 <= PH < 11 |
| POWER_HEADROOM_3 | PH >= 11 |

TABLE 2

PHR mapping table at coverage level 1 or 2

| PHR value (Value) | Measured quantity value |
|---|---|
| POWER_HEADROOM_0 | [−54] <= PH <− 10 |
| POWER_HEADROOM_1 | −10 <= PH <− 2 |
| POWER_HEADROOM_2 | −2 <= PH < 6 |
| POWER_HEADROOM_3 | PH >= 6 |

After receiving the PHR value sent by the terminal, the network device determines the coverage level, determines, based on the coverage level and the PHR value, a value of $PH_c(i)$ and may obtain a path loss value in combination with other parameters in the formula.

S204: Determine, based on the PL and the obtained interference margin, the repetition count of the UCI of the terminal.

In this step, the network device determines, based on the path loss PL and a value of the interference margin, a coverage level to configure the repetition count of the UCI. Specifically, a threshold may be set, and the threshold can be configured. If a sum of (PL+interference margin) is greater than the threshold, the repetition count of the UCI is configured based on a high coverage level (for example, the coverage level 1 or 2). Otherwise, the repetition count of the UCI is configured based on a low coverage level (for example, the coverage level 0). The high coverage level and the low coverage level are relative values, and a specific value of the high coverage level or the low coverage level is not limited.

S205: Carry the repetition count of the UCI in an RRC connection establishment message sent to the terminal.

In this step, after determining the repetition count of the UCI, the network device carries the repetition count of the UCI in the connection establishment message, and sends the connection establishment message to the terminal, so that the terminal calculates the transmit power based on the repetition count of the UCI.

If the path loss or the interference changes, the procedure may be triggered again. The repetition count of the UCI is updated and the network device re-delivers the repetition count of the UCI. When the PL of the terminal and/or the interference margin change/changes, the network device re-determines, based on a changed PL and interference margin, the repetition count of the UCI of the terminal, and sends a re-determined repetition count of the UCI to the terminal, so that the terminal can obtain the uplink transmit power through another calculation.

In an actual implementation, the interference margin is calculated based on the NI value, where the NI value can be reported every 10 ms.

According to the uplink transmit power determining method provided in this embodiment, a current uplink path loss value is estimated based on the PHR value. The repetition count of the UCI is adaptively configured based on comprehensive consideration of the PHR value and the cell-level interference margin, and is sent to the terminal, so that the terminal determines the uplink transmit power. Uplink power control and repetition count selection are decoupled from a downlink coverage level. This increases flexibility in configuring the repetition count of the UCI and reduces cases in which the repetition count of the UCI is greater than 2 for a cell center user. In this way, a quantity of times of uplink full-power transmission are reduced, uplink interference is reduced, and power consumption of the cell center UE is reduced.

Figure 5:
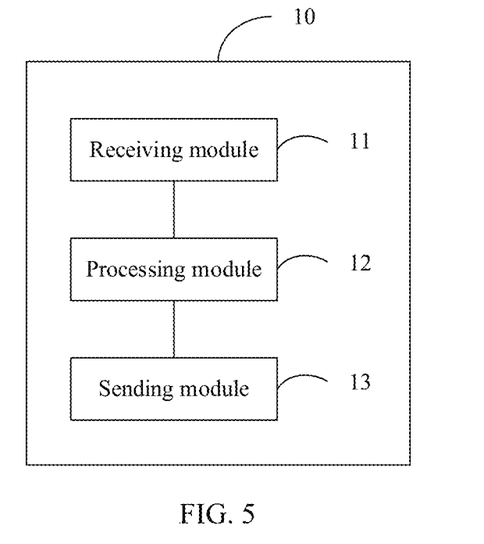
FIG. 5 is a schematic structural diagram of Embodiment 1 of a network device according to this application.

FIG. 5 is a schematic structural diagram of Embodiment 1 of a network device according to this application. As shown in FIG. 5, the network device 10 includes:

a receiving module 11, configured to receive a power headroom report PHR reported by a terminal;

a processing module 12, configured to obtain a current path loss PL of the terminal based on the PHR, where the processing module 12 is further configured to determine, based on the PL and an obtained interference margin, a repetition count of UCI of the terminal; and a sending module 13, configured to send the repetition count of the UCI to the terminal, where the repetition count of the UCI is used to determine an uplink transmit power.

The network device provided in this embodiment is configured to implement the technical solutions according to any one of the foregoing method embodiments. Implementation principles and technical effects thereof are similar. The repetition count of the UCI on a user side is adaptively configured based on the PL and an interference, to determine whether the repetition count of the UCI needs to be configured based on a low coverage level for a user currently accessing at a high coverage level, so that a transmit power of the UCI is controlled, and an avalanche effect caused by always selecting full-power uplink transmission is avoided.

Based on the foregoing embodiment, the processing module 12 is specifically configured to:

compare a sum of the PL and the interference margin with a preset threshold; and if the sum of the PL and the interference margin is greater than the threshold, determine the repetition count of the UCI based on the high coverage level; or if the sum of the PL and the interference margin is less than the threshold, determine the repetition count of the UCI based on the low coverage level.

Optionally, the processing module 12 is further configured to:

obtain the interference margin through calculation based on a detected interference noise value.

Optionally, the processing module 12 is specifically configured to:

obtain the current PL of the terminal through inverse calculation according to a calculation formula $PH_c(z)= P_{CMAX,c}(i)-\{P_{O\_NPUSCH,c}(1)+\alpha_c(1) \cdot PL_c\}$ of the PHR, where represents a slot, $PH_c(i)$ is a lower limit of a measured quantity value corresponding to the PHR, $P_{O\_NPUSCH,c}(1)$ is an expected power that is for non-persistent scheduling and that is configured by the network device, $\alpha_c(1)$ is a path loss factor configured by the network device, $P_{CMAX,c}(i)$ is a maximum transmit power allowed by the terminal device, and $PL_c$ is the current PL of the terminal.

Optionally, the receiving module 11 is specifically configured to:

receive, in a random access process, the PHR sent by the terminal in a radio resource control RRC connection request message.

Optionally, the sending module 12 is specifically configured to:

carry the repetition count of the UCI in an RRC connection establishment message sent to the terminal.

Optionally, the processing module 12 is further configured to:

when the PL of the terminal and/or the interference margin change/changes, re-determine, based on a changed PL and interference margin, the repetition count of the UCI of the terminal.

The sending module 13 is further configured to send a re-determined repetition count of the UCI to the terminal.

The network device provided in any one of the foregoing embodiments is configured to implement the technical solutions according to any one of the foregoing method embodiments. Implementation principles and technical effects are similar. Details are not described herein again.

Figure 6:
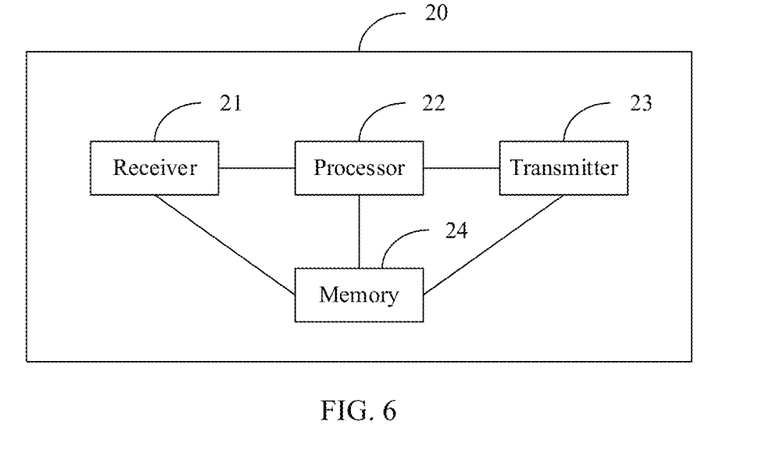
FIG. 6 is a schematic structural diagram of Embodiment 2 of a network device according to this application.

FIG. 6 is a schematic structural diagram of Embodiment 2 of a network device according to this application. As shown in FIG. 6, the network device 20 includes:

a receiver 21, configured to receive a power headroom report PHR reported by a terminal;

a processor 22, configured to obtain a current path loss PL of the terminal based on the PHR, where the processor 22 is further configured to determine, based on the PL and an obtained interference margin, a repetition count of UCI of the terminal; and a transmitter 23, configured to send the repetition count of the UCI to the terminal, where the repetition count of the UCI is used to determine an uplink transmit power.

Optionally, the network device may further include a memory 24 configured to store data and an executable computer program.

Optionally, the processor 22 is specifically configured to:

compare a sum of the PL and the interference margin with a preset threshold; and if the sum of the PL and the interference margin is greater than the threshold, determine the repetition count of the UCI based on a high coverage level; or if the sum of the PL and the interference margin is less than the threshold, determine the repetition count of the UCI based on a low coverage level.

Optionally, the processor 22 is further configured to:

obtain the interference margin through calculation based on a detected interference noise value.

Optionally, the processor 22 is specifically configured to:

obtain the current PL of the terminal through inverse calculation according to a calculation formula $PH_c(1)= P_{CMAX,c}(i)-\{P_{O\_NPUSCH,c}(1)+\alpha_c(1) \cdot PL_c\}$ of the PHR, where i represents a slot, $PH_c(i)$ is a lower limit of a measured quantity value corresponding to the PHR, $P_{O\_NPUSCH,c}(1)$ is an expected power that is for non-persistent scheduling and that is configured by the network device, $\alpha_c(1)$ is a path loss factor configured by the network device, $P_{CMAX,c}(i)$ is a maximum transmit power allowed by the terminal device, and $PL_c$ is the current PL of the terminal.

Optionally, the receiver 21 is specifically configured to:
receive, in a random access process, the PHR sent by the terminal in a radio resource control RRC connection request message.

Optionally, the transmitter 23 is specifically configured to:
carry the repetition count of the UCI in an RRC connection establishment message sent to the terminal.

Optionally, the processor 22 is further configured to:
when the PL of the terminal and/or the interference margin change/changes, re-determine, based on a changed PL and interference margin, the repetition count of the UCI of the terminal.

The transmitter 23 is further configured to send a re-determined repetition count of the UCI to the terminal.

The network device provided in any one of the foregoing embodiments is configured to implement the technical solutions according to any one of the foregoing method embodiments. Implementation principles and technical effects are similar. Details are not described herein again.

This application further provides a computer-readable storage medium. The computer-readable storage medium stores a computer program, and the computer program is used to implement the uplink transmit power determining method according to any one of the implementations of the foregoing method embodiments.

This application further provides a computer program product. The computer program product includes a computer program, and when the computer program is run by a network device, the network device is enabled to perform the uplink transmit power determining method according to any one of the implementations of the foregoing method embodiments.

In the foregoing implementations of the network device, it should be understood that the processor may be a central processing unit (CPU for short), or may be another general-purpose processor, a digital signal processor (DSP for short), an application-specific integrated circuit (ASIC for short), or the like. The general-purpose processor may be a microprocessor, or the processor may be any conventional processor or the like. The steps of the method disclosed with reference to the embodiments of this application may be directly performed and completed by a hardware processor, or may be performed and completed by a combination of hardware and a software module in the processor.

All or some of the steps of the method embodiments may be implemented by hardware related to a program instruction. The foregoing program may be stored in a readable memory. When the program is executed, the steps of the method embodiments are performed. The foregoing memory (storage medium) includes: a read-only memory (ROM for short), a RAM, a flash memory, a hard disk, a solid-state drive, a magnetic tape, a floppy disk, an optical disc, and any combination thereof.

What is claimed is:

1. An uplink transmit power determining method, wherein the method comprises:
receiving a power headroom report (PHR) reported by a terminal;
obtaining a current path loss (PL) of the terminal based on the PHR;
determining, based on the PL and an obtained interference margin, a repetition count of uplink control information (UCI) of the terminal; and
sending the repetition count of the UCI to the terminal, wherein the repetition count of the UCI is used to determine an uplink transmit power;
wherein the determining, based on the PL and an obtained interference margin, a repetition count of UCI of the terminal comprises:
comparing a sum of the PL and the interference margin with a preset threshold; and
if the sum of the PL and the interference margin is greater than the threshold, determining the repetition count of the UCI based on a high coverage level; or
if the sum of the PL and the interference margin is less than the threshold, determining the repetition count of the UCI based on a low coverage level.

2. The method according to claim 1, wherein the method further comprises:
obtaining the interference margin through calculation based on a detected interference noise value.

3. The method according to claim 1, wherein the obtaining a current path loss (PL) of the terminal based on the PHR comprises:
obtaining the current PL of the terminal through inverse calculation according to a calculation formula $PH_c(i) = P_{CMAX,c}(i) - \{P_{O\_NPUSCH,c}(1) + \alpha_c(1) \cdot PL_c\}$ of the PHR, wherein i represents a slot, $PH_c(i)$ is a lower limit of a measured quantity value corresponding to the PHR, $P_{O\_NPUSCH,c}(1)$ is an expected power that is for non-persistent scheduling and that is configured by a network device, $\alpha_c(1)$ is a path loss factor configured by the network device, $P_{CMAX,c}(i)$ is a maximum transmit power allowed by the terminal device, and $PL_c$ is the current PL of the terminal.

4. The method according to claim 1, wherein the receiving a power headroom report (PHR) reported by a terminal comprises:
receiving, in a random access process, the PHR sent by the terminal in a radio resource control (RRC) connection request message.

5. The method according to claim 1, wherein the sending the repetition count of the UCI to the terminal comprises:
carrying the repetition count of the UCI in an RRC connection establishment message sent to the terminal.

6. The method according to claim 1, wherein the method further comprises:
when the PL of the terminal and/or the interference margin change/changes, re-determining, based on a changed PL and/or an interference margin, the repetition count of the UCI of the terminal, and sending a re-determined repetition count of the UCI to the terminal.

7. A network device, comprising:
a receiver, configured to receive a power headroom report (PHR) reported by a terminal;
a processing circuit, configured to obtain a current path loss (PL) of the terminal based on the PHR, wherein the processing circuit is further configured to determine, based on the PL and an obtained interference margin, a repetition count of uplink control information (UCI) of the terminal; and
a transmitter, configured to send the repetition count of the UCI to the terminal, wherein the repetition count of the UCI is used to determine an uplink transmit power;
wherein the processing circuit is configured to:
compare a sum of the PL and the interference margin with a preset threshold; and
if the sum of the PL and the interference margin is greater than the threshold, determine the repetition count of the UCI based on a high coverage level; or if the sum of the PL and the interference margin is less than the threshold, determine the repetition count of the UCI based on a low coverage level.

8. The network device according to claim 7, wherein the processing circuit is further configured to:
obtain the interference margin through calculation based on a detected interference noise value.

9. The network device according to claim 7, wherein the processing circuit is configured to:
obtain the current PL of the terminal through inverse calculation according to a calculation formula $PH_c(i) = P_{CMAX,c}(i) - \{P_{O\_NPUSCH,c}(1) + \alpha_c(1) \cdot PL_c\}$ of the PHR, wherein i represents a slot, $PH_c(i)$ is a lower limit of a measured quantity value corresponding to the PHR, $P_{O\_NPUSCH,c}(1)$ is an expected power that is for non-persistent scheduling and that is configured by the network device, $\alpha_c(1)$ is a path loss factor configured by the network device, $P_{CMAX,c}(i)$ is a maximum transmit power allowed by the terminal device, and $PL_c$ is the current PL of the terminal.

10. The network device according to claim 7, wherein the receiver is configured to:
receive, in a random access process, the PHR sent by the terminal in a radio resource control (RRC) connection request message.

11. The network device according to claim 7, wherein the transmitter is configured to:
carry the repetition count of the UCI in an RRC connection establishment message sent to the terminal.

12. The network device according to claim 7, wherein the processing circuit is further configured to:
when the PL of the terminal and/or the interference margin change/changes, re-determine, based on a changed PL and an interference margin, the repetition count of the UCI of the terminal; and
the sending module is further configured to send a re-determined repetition count of the UCI to the terminal.

13. A network device, comprising:
a receiver, configured to receive a power headroom report (PHR) reported by a terminal;
a processor, configured to obtain a current path loss (PL) of the terminal based on the PHR, wherein the processor is further configured to determine, based on the PL and an obtained interference margin, a repetition count of uplink control information (UCI) of the terminal; and
a transmitter, configured to send the repetition count of the UCI to the terminal, wherein the repetition count of the UCI is used to determine an uplink transmit power;
wherein the processor is configured to:
compare a sum of the PL and the interference margin with a preset threshold; and
if the sum of the PL and the interference margin is greater than the threshold, determine the repetition count of the UCI based on a high coverage level; or
if the sum of the PL and the interference margin is less than the threshold, determine the repetition count of the UCI based on a low coverage level.

14. The network device according to claim 13, wherein the processor is further configured to:
obtain the interference margin through calculation based on a detected interference noise value.

15. The network device according to claim 13, wherein the processor is configured to:
obtain the current PL of the terminal through inverse calculation according to a calculation formula $PH_c(i) = P_{CMAX,c}(i) - \{P_{O\_NPUSCH,c}(1) + \alpha_c(1) \cdot PL_c\}$ of the PHR, where i represents a slot, $PH_c(i)$ is a lower limit of a measured quantity value corresponding to the $P_{O\_NPUSCH,c}(1)$ is an expected power that is for non-persistent scheduling and that is configured by the network device, $\alpha_c(1)$ is a path loss factor configured by the network device, $P_{CMAX,C}(i)$ is a maximum transmit power allowed by the terminal device, and $PL_c$ is the current PL of the terminal.

16. The network device according to claim 13, wherein the receiver is configured to:
receive, in a random access process, the PHR sent by the terminal in a radio resource control (RRC) connection request message.

17. The network device according to claim 13, wherein the transmitter is configured to:
carry the repetition count of the UCI in an RRC connection establishment message sent to the terminal.

* * * * *

UNITED STATES PATENT AND TRADEMARK OFFICE
CERTIFICATE OF CORRECTION

| | | |
|---|---|---|
| PATENT NO. | : 11,963,106 B2 | Page 1 of 1 |
| APPLICATION NO. | : 17/169857 | |
| DATED | : April 16, 2024 | |
| INVENTOR(S) | : Wenjie Sun et al. | |

It is certified that error appears in the above-identified patent and that said Letters Patent is hereby corrected as shown below:

On the Title Page

In item (57), in Column 2, in "Abstract", Lines 7-8, delete "interference" and insert -- interference, --.

In item (57), in Column 2, in "Abstract", Line 8, delete "the and the" and insert -- and the --.

In the Claims

In Column 14, Line 28, in Claim 3, delete "$P_{CMAX,C}(i)$" and insert -- $P_{CMAX,c}(i)$ --.

In Column 15, Line 16, in Claim 9, delete "$P_{O\_NPUSCH,C}(1)$" and insert -- $P_{O\_NPUSCH,c}(1)$ --.

In Column 15, Line 19, in Claim 9, delete "$P_{CMAX,C}(i)$" and insert -- $P_{CMAX,c}(i)$ --.

In Column 16, Line 27, in Claim 15, delete "$P_{O\_NPUSCH,C}(1)$" and insert -- $P_{O\_NPUSCH,c}(1)$ --.

In Column 16, Line 30, in Claim 15, delete "$P_{CMAX,C}(i)$" and insert -- $P_{CMAX,c}(i)$ --.

Signed and Sealed this
Eighteenth Day of June, 2024

Katherine Kelly Vidal
*Director of the United States Patent and Trademark Office*